United States Patent [19]
Zenhäusern et al.

[11] 3,779,701
[45] Dec. 18, 1973

[54] NON-AQUEOUS DYEING OF POLYAMIDES WITH WATER-SOLUBLE AMORIC DYESTUFFS DISSOLVED IN HALOGENATED HYDRO-CARBONS

[75] Inventors: Anton Zenhäusern, Reinach; Jakob Bühler, Muttenz, both of Switzerland

[73] Assignee: Ciba-Geigy AG, Basel, Switzerland

[22] Filed: Dec. 15, 1970

[21] Appl. No.: 98,455

[30] Foreign Application Priority Data
Dec. 16, 1969 Switzerland.................. 18708/69

[52] U.S. Cl............................. 8/39, 8/21 B, 8/82, 260/378
[51] Int. Cl............................ C09b 1/26, D06p 1/20
[58] Field of Search................. 8/21, 39; 260/378

[56] References Cited
UNITED STATES PATENTS

| | | | |
|---|---|---|---|
| 3,510,243 | 5/1970 | Seuret et al............................... | 8/39 |
| 3,320,021 | 5/1967 | Guenthard............................... | 8/39 |
| 3,491,126 | 1/1970 | Schwander et al................. | 260/374 |
| 3,434,792 | 3/1969 | Lewis....................................... | 8/39 |

FOREIGN PATENTS OR APPLICATIONS
1,581,325  9/1969  France

OTHER PUBLICATIONS
Milicevic, Text. Chem. & Col., Vol. 2, (5), 1970, p. 17–20, 25–28.

*Primary Examiner*—George F. Lesmes
*Assistant Examiner*—Patricia C. Ives
*Attorney*—Wenderoth, Lind & Ponack

[57] ABSTRACT

A process for the non-aqueous dyeing or printing of nitrogen-containing fibre material, especially fibre material made from natural or synthetic polyamide, with certain water-soluble anionic anthraquinone dyestuffs from non-polar, aprotic organic solvents is disclosed. By said process even, strongly-coloured dyeings having good fastness properties are obtained; said process is moreover advantageous in that it can be carried out without the use of solubilising agents and without fire hazard in a uniform solvent which can be easily regenerated.

8 Claims, No Drawings

NON-AQUEOUS DYEING OF POLYAMIDES WITH WATER-SOLUBLE AMORIC DYESTUFFS DISSOLVED IN HALOGENATED HYDRO-CARBONS

The present invention relates to a process for the dyeing or nitrogen-containing fibre material, particularly natural and synthetic polyamide fibres, such as wool and nylon, with water-soluble anionic dyestuffs in organic solvents as well as the fibre material dyed by this process.

It is known that natural and synthetic polyamide fibres can be dyed with anionic water soluble dyestuffs in an aqueous solution. Lately, however, attempts have been made to replace the aqueous medium for the dyeing process by organic solvents. This would be very desirable, especially in view of the problems connected with the waste waters. Moreover, when using organic solvents, the fibre material can be pre-treated, dyed and after-treated in the same bath. While organic solvents have been readily adopted by the industry for the dry cleaning, their use in textile dyeing still meets with a series of problems. In particular, the solubility of usual water-soluble dyestuffs in organic media represents a problem which has not been solved satisfactorily up to now.

Attempts have been made to transform the usual organic dyestuffs, employed in the form of water-soluble sodium sulphonates, with organic amines into water-insoluble salts which are soluble in organic media; this additional processing step, however, results in a substantial increase in cost of the dyestuffs. Furthermore, also strongly polar organic solvents, such as methanol or ethanol, alone or as solubilizing agents, in admixture with non-polar organic solvents have already been used. Finally, attempts have been made to effect dyeing with solvent emulsions instead of homogeneous mixtures.

While the use of polar organic solvents leads to technical difficulties, especially due to the fire hazard connected therewith, the use of solvent emulsions is undesirable from a tinctorial viewpoint.

It has been found that the usual application form of certain water-soluble anionic dyestuffs which correspond to the general Formulae I and II

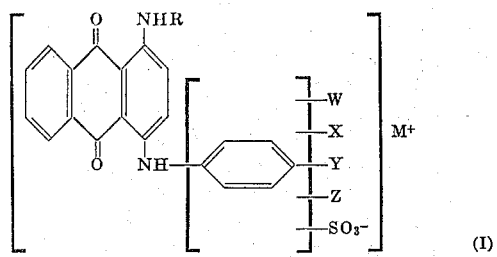

(I)

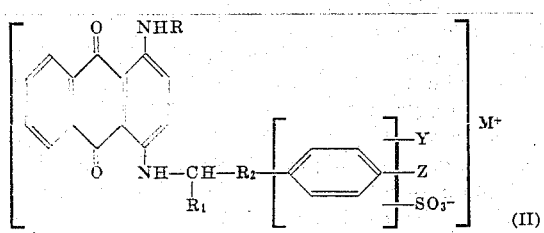

(II)

can be used directly for the dyeing of nitrogen-containing fibre material in non-polar aprotic organic solvents.

In said Formulae I and II:
R represents an alkyl group having from 1 to 12 carbon atoms or a cyclohexyl radical unsubstituted or substituted by lower alkyl groups,
$R_1$ represents hydrogen or a lower alkyl group,
$R_2$ represents a lower alkylene radical,
W represents hydrogen or the methyl group,
X represents hydrogen, an alkyl group having from 1 to 12 carbon atoms, the cyclohexyl radical or an optionally substituted aryloxy radical,
Y represents hydrogen, a lower alkyl group, the trifluoromethyl group, a lower alkoxy group or a halogen atom,
Z represents hydrogen, a lower alkyl group or a lower alkoxy group, and
$M^+$ represents an alkali metal cation, ammonium or half the equivalent of the charge of an alkaline earth metal cation. The expression "lower" in connection with alkyl or alkoxy or an aliphatic halogenated hydrocarbon means that the respective radical or the respective compound have from 1 to 4 carbon atoms; such radicals are, e.g., methyl, ethyl, isopropyl, n.butyl, sec.butyl, isobutyl or tert.butyl radicals.

R in the meaning of an alkyl group having from 1 to 12 carbon atoms represents, for example, methyl, isopropyl, 1,2-dimethylpropyl, butyl, sec.butyl, 1,3-dimethylbutyl, isohexyl, 2-ethylhexyl, octyl, decyl and dodecyl. If R represents a cyclohexyl radical substituted by lower alkyl groups then it represents, e.g., the 4-methylcyclohexyl radical, 3,5,5-trimethylcyclohexyl radical or 4-tert.butylcyclohexyl radical.

$R_2$ in the meaning of a lower alkylene radical represents, for example, a methylene, dimethylene, propylene or trimethylene radical.

The meaning of X as an alkyl group having from 1 to 12 carbon atoms corresponds to that given above for R. X, in the meaning of an optionally substituted aryloxy radical preferably represents a phenoxy radical, unsubstituted or substituted by halogen atoms, such as chlorine or bromine, or alkyl or alkoxy groups having from 1 to 5 carbon atoms.

If Y represents a halogen atom, fluorine, chlorine or bromine are meant, for instance.

Examples of $M^+$ in the meaning of an alkali metal cation are the lithium, sodium or potassium cation; examples of $M^+$ in the meaning of an alkaline earth metal cation are the magnesium, strontium or barium cation.

Preferably, R represents a branched lower alkyl group such as the sec. butyl group, more particularly, however, the isopropyl group, or the cyclohexyl radical.

W and Z, preferably each represent hydrogen, while X preferably represents hydrogen or a methylphenoxy radical.

Y preferably represents hydrogen, particularly, however, a lower alkyl group or a halogen atom, especially the methyl group, the ethyl group or chlorine.

$R_1$ preferably represents a methyl or an isobutyl group, while $R_2$ is preferably the dimethylene radical.

$M^+$ preferably represents an alkali metal cation and more particularly the sodium cation.

Dyestuffs of the general Formula I, wherein R represents a lower alkyl group or an optionally methyl-substituted cyclohexyl radical, W and Z each represent hydrogen, X represents hydrogen or a methylphenoxy radical, Y represents a lower alkyl group or a halogen atom, and M$^+$ represents an alkali metal cation, more particularly those wherein R and Y each represent a lower alkyl group, W, X and Z each represent hydrogen and M$^+$ represents the sodium cation, have proved particularly suitable.

Dyestuffs of the general Formula II, wherein R represents a lower alkyl group, especially isopropyl, R$_1$ represents a lower alkyl group, especially isobutyl, R$_2$ represents the dimethylene radical, Y and Z each represent hydrogen, and M$^+$ represents an alkali metal cation, particularly the sodium cation, are also preferred.

In the following, examples of dyestuffs of Formula I, usable according to the invention, are listed, the position of the sulphonic acid group on the phenyl radical being indicated by "Q" when said position cannot be determined:

1-methylamino-4-(2-sodium-sulpho-4-tert.butyl)-phenylamino-anthraquinone,
1-isopropylamino-4-(2-sodium-sulpho-4-octyl)-phenylamino-anthraquinone,
1-isopropylamino-4-(2-sodium-sulpho-4-dodecyl)-phenylamino-anthraquinone,
1-isopropylamino-4-(2-sodium-sulpho-4-cyclohexyl)-phenylamino-anthraquinone,
1-isopropylamino-4-(Q-sodium-sulpho-3-trifluoromethyl)-phenylamino-anthraquinone,
1-isopropylamino-4-(Q-sodium-sulpho-2,5-dibutoxy)-phenylamino-anthraquinone,
1-isopropylamino-4-(Q-sodium-sulpho-2-methyl-6-ethyl)-phenylamino-anthraquinone,
1-isopropylamino-4-(Q-sodium-sulpho-2,6-diethoxy)-phenylamino-anthraquinone,
1-isopropylamino-4-(2-sodium-sulpho-3,4,5-trimethyl)-phenylamino-anthraquinone,
1-isopropylamino-4-(Q-sodium-sulpho-3,5-di-tert.butyl)-phenylamino-anthraquinone,
1-isopropylamino-4-(2,3,5,6-tetramethyl-4-sodium-sulpho)-phenylamino-anthraquinone,
1-isopropylamino-4-(Q-sodium-sulpho-4-butoxy)-phenylamino-anthraquinone,
1-sec.butylamino-4-(2-magnesium-sulpho-4-methyl)-phenylamino-anthraquinone,
1-sec.butylamino-4-(Q-sodium-sulpho-4-bromo)-phenylamino-anthraquinone,
1-sec.butylamino-4-(Q-sodium-sulpho-3-methoxy-4-methyl)-phenylamino-anthraquinone,
1-(1,2-dimethyl)-propylamino-4-(2-sodium-sulpho-4-methyl)-phenylamino-anthraquinone,
1-(1,3-dimethyl)-butylamino-4-(2-sodium-sulpho-4-methyl)-phenylamino-anthraquinone,
1-(2-ethyl)-hexylamino-4-(2-sodium-sulpho-4-methyl)-phenylamino-anthraquinone,
1-octylamino-4-(2-potassium-sulpho-4-methyl)-phenylamino-anthraquinone,
1-dodecylamino-4-(2-ammonium-sulpho-4-methyl)-phenylamino-anthraquinone,
1-cyclohexylamino-4-(2-sodium-sulpho-4-butyl)-phenylamino-anthraquinone,
1-cyclohexylamino-4-(2-sodium-sulpho-4-isopropyl)-phenylamino-anthraquinone,
1-(4-tert.butyl)-cyclohexylamino-4-(Q-sodium-sulpho-3-methoxy-4-methyl)-phenylamino-anthraquinone,
1-(3,5,5-trimethyl)-cyclohexylamino-4-(2-lithium-sulpho-4-methyl)-phenylamino-anthraquinone.

Dyestuffs of Formula I, particularly suitable for the process according to the invention, are:

1-isopropylamino-4-(2-sodium-sulpho-4-ethyl)-phenylamino-anthraquinone,
1-isopropylamino-4-(Q-sodium-sulpho-4-chloro)-phenylamino-anthraquinone,
1-sec.butylamino-4-(2-sodium-sulpho-4-methyl)-phenylamino-anthraquinone,
1-cyclohexylamino-4-(2-sodium-sulpho-4-methyl)-phenylamino-anthraquinone,
1-(3'-dimethyl-5'-methylcyclohexylamino)-4-[Q-sodium-sulpho-4-(4''-methylphenoxy)]-phenylamino-anthraquinone,
1-(3'-dimethyl-5'-methylcyclohexylamino)-4-(Q-sodium-sulpho-4-chloro-2-phenoxy)-phenylamino-anthraquinone,
1-(3'-dimethyl-5'-methylcyclohexylamino)-4-[Q-sodium-sulpho-2-(2''-methylphenoxy)]-phenylamino-anthraquinone,
1-(3'-dimethyl-5'-methylcyclohexylamino)-4-[Q-sodium-sulpho-2-(4''-n.amylphenoxy)]-phenylamino-anthraquinone, more particularly, however,
1-isopropylamino-4-(2-sodium-sulpho-4-methyl)-phenylamino-anthraquinone.

Examples of dyestuffs of Formula II, usable according to the invention, in which the position of the sulphonic acid group on the phenyl radical cannot be determined and is equally designated by "Q," are:

1-isopropylamino-4-[1'-isobutyl-3'-(Q''-lithium-sulpho)-phenyl]-propylamino-anthraquinone,
1-isopropylamino-4-[1'-isobutyl-3'-(Q''-potassium-sulpho)-phenyl]-propylamino-anthraquinone,
1-isopropylamino-4-[1'-methyl-3'-(Q''-sodium-sulpho-2''''-dimethyl)-phenyl]-propylamino-anthraquinone,
1-isopropylamino-4-[1'-isobutyl-3'-(Q''-sodium-sulpho-4''-methyl)-phenyl]-propylamino-anthraquinone,
1-isopropylamino-4-[1'-isobutyl-3'-(Q''-sodium-sulpho-4''-methoxy)-phenyl]-propylamino-anthraquinone,
1-isopropylamino-4-[1'-isobutyl-3'-(Q''-sodium-sulpho-2''5''-dimethoxy)-phenyl]-propylamino-anthraquinone,
1-isopropylamino-4-[1'-isobutyl-3'-(Q''-sodium-sulpho-4''-chloro)-phenyl]-propylamino-anthraquinone,
1-isopropylamino-4-[1'-isobutyl-3'-(Q''-sodium-sulpho-2''-bromo)-phenyl]-propylamino-anthraquinone,
1-sec.butylamino-4-[1'-isobutyl-3'-(Q''-sodium-sulpho)-phenyl]-propylamino-anthraquinone,
1-sec.butylamino-4-[1'-isobutyl-3'-(Q''-sodium-sulpho-4''-isopropyl)-phenyl]-propylamino-anthraquinone,
1sec.butylamino-4-[1'-isobutyl-3'-(Q''-sodium-sulpho-4''-butoxy)-phenyl]-propylamino-anthraquinone,
1-(1,2-dimethyl)-propylamino-4-[1'-methyl-2'-(Q''-sodium-sulpho)-phenyl]-ethylamino-anthraquinone, 1-(1,2-dimethyl)-propylamino-4-[1'-methyl-2'-(Q''-sodium-sulpho-3'',5''-dibutoxy)-phenyl]-ethylamino-anthraquinone, 1-dodecylamino-4-[2'-methyl-3'-(Q''-sodium-sulpho)-phenyl]-propylamino-anthraquinone, 1-(1,2-dimethyl)-propylamino-4-[1'-methyl-2'-(Q''-sodium-sulpho-2'',5''-dibutyl)-phenyl]-ethylamino-anthraquinone, 1-butylamino-4-[1'-methyl-2'-(Q''-sodium-sulpho)-phenyl]-ethylamino-anthraquinone, 1-(1,3-dimethyl)-butylamino-4-[1',2'-dimethyl-3'-(Q''-sodium-sulpho)-phenyl]-propylamino-anthraquinone, 1-octylamino-4-[1'-isobutyl-3'-(Q''-potassium-sulpho)-phenyl]-propylamino-anthraquinone, 1-dodecylamino-4-[1'-isobutyl-3'-(Q''-ammonium-sulpho)-phenyl]-propylamino-anthraquinone, 1-cyclohexylamino-4-[1'-isobutyl-3'-(Q''-magnesium-sulpho)-phenyl]-propylamino-anthraquinone, 1-cyclohexylamino-4-[1'-isobutyl-3'-(Q''-potassium-sulpho-4''-butyl)-phenyl]-propylamino-anthraquinone, 1-(3,5,5-trimethyl)-cyclohexylamino-4-[1'-methyl-2'-(Q''-potassium-sulpho)-phenyl]-ethylamino-anthraquinone, 1-(3,5,5-trimethyl)-cyclohexylamino-4-[1'-methyl-2'-(Q''-sodium-sulpho-3''-trifluoromethyl)-phenyl]-ethylamino-anthraquinone.

Of the dyestuffs corresponding to Formula II 1-isopropylamino-4-[1'-isobutyl-3'-(Q''-sodium-sulpho)-phenyl]-propylamino-anthraquinone is particularly suitable for the process according to the invention.

The anionic dyestuffs, usable according to the invention, can be prepared by methods known per se. Dyestuffs of Formula I are obtained, e.g., by reacting a 1-alkylamino-4-bromo-anthraquinone with the corresponding phenylamine free from sulphonic acid groups, in solution or in the melt of excess phenylamine, in the presence of copper or a copper compound, such as copper(I)chloride, and an acid-binding agent, such as sodium acetate, and subsequently sulphonating the resulting 1-alkylamino-4-phenylamino-anthraquinone compound.

Dyestuffs of Formula II can be prepared in an analogous manner by reacting a 1-alkylamino-4-bromo-anthraquinone with the corresponding aralkylamine and subsequent sulphonating.

Examples of non-polar aprotic solvents suitable for the process according to the invention are liquid hydrocarbons boiling above 30° C, i.e., aromatic hydrocarbons such as xylene or chlorobenzene, principally dichlorobenzene, trichlorobenzene or tetrahydronaphthalene, aliphatic hydrocarbons such as hexane, heptane, octane or decane, aliphatic perfluorohydrocarbons such as perfluorohexane or perfluoroheptane, and cycloaliphatic hydrocarbons such as cyclohexane, particularly cyclohexene. However, in view of their generally better regeneration property and non-combustibility, preferably lower aliphatic halogenated hydrocarbons are used, especially lower aliphatic chlorinated hydrocarbons, e.g., dichloromethane, chloroform, carbon tetrachloride, trichloroethylene, tribromoethylene, tetrachloroethylene ("perchloroethylene"), trichloroethane, tetrachloroethane, 1,1,2-trichloro-2,2,1-trifluoroethane, 1,1,1,2-tetrachloro-2,2-difluoroethane, pentachlorofluoroethane or 1-chloro-3-fluoropropane. Also mixtures of such solvents can be used. Moreover, the solvents can contain stabilizing agents — which is the case quite often with technical products — such as the 1,1,1-trichloroethane known under the trade name Chlorothene NU (Dow Chemical Co., Midland, Michigan, USA).

Trichloroethylene, more particularly, however, tetrachloroethylene, are especially suitable as non-polar aprotic solvent.

Examples of nitrogen-containing fibre material are proteinic fibres such as wool and silk, fibres made from polyurethanes, particularly however fibre material made from synthetic polyamide. In the case of wool, dyeing is preferably carried out in the presence of from 1 to 5 percent by weight of water, calculated on the weight of the dye liquor, and, optionally in the presence of a small amount of an emulsifying agent.

As fibre material made from synthetic polyamide which can be dyed by the process according to the invention, the following can be mentioned as examples: condensation products from hexamethylene diamine and adipic acid (Polyamide 6.6) or sebacic acid (Polyamide 6.10) or mixed condensation products, e.g. those from hexamethylene diamine, adipic acid and ε-caprolactam (Polyamide 6.6/6), also polymerisation products from ε-caprolactam, known under the trade names "Nylon 6," "Perlon," "Grilon" or "Enkalon," or those from ω-aminoundecanoic acid (Polyamide 11 and "Rilsan," respectively).

These fibres can be used in any desired form, thus, e.g., in the form of loose material, rovings, yarns or knitted goods such as knitted fabrics, woven fabrics and bonded fabrics as well as textile floor coverings such as woven, tufted or matted carpets.

Also blends of such fibres, particularly wool/polyamide blends can be employed.

Advantageously, the dyeing of the fibre material is carried out by the usual dis-continuous or continuous processes, e.g. according to the exhaustion process, or by impregnating the fibre material such as by nip-padding, spraying or printing, preferably, however, by padding.

In the exhaustion process the fibre material is dyed in a stationary bath in loose form or attached to mechanical devices. Depending on the type of the goods to be dyed, especially jiggers, winch machines, cheese winders or similar dyeing apparatuses are employed for this purpose. The dyestuff is dissolved in the organic solvent, whereupon the fibre material is introduced into the dye liquor, at a liquor ratio of from 1:5 to 1:100. After having heated the dye bath to the desired temperature, which depends on the solvent chosen and the type of fibres and which generally is comprised between 40° and 130° C, dyeing is performed for about 5 to 45 minutes at this temperature. Thereafter the dyeing, conveniently after rinsing with the non-polar aprotic solvent, is dried. The dyeing can also be carried out at a temperature above the boiling temperature of the solvent in a closed system.

The dyestuffs can also be applied to the fibre material according to the so-called "space-dyeing" method ("random dyeing") by injecting the dye liquor into packages by means of hollow needles, and other known processes.

In the case of the pad-dyeing method the dyestuffs are preferably dissolved in the non-polar aprotic solvent. Then the fibre material is guided through the dye solution, advantageously at room temperature, and then squeezed out to the desired content of impregnating liquor of about 60 to 100 percent by weight (referred to the dry weight of the goods). The major portion of the solvent remaining in the fibre material is then usually removed under mild conditions, for instance in a stream of warm air at temperatures up to 100° C, depending on the solvent. Fixing of the dyestuff on the thus dried fibre material can be effected by steaming, e.g. with aqueous steam or with solvent steam, or, preferably by a dry heat treatment at temperatures below the softening point of the fibre material. These two types of heat treatment can also be combined. For the dry heat treatment contact heat, a dry stream of hot air, infra-red irradiation or the action of high frequency alternating currents are suitable. The dry heat treatment by means of contact heat, however, has proved to be particularly useful. For this purpose, the pre-dried goods are advantageously guided over heated rotating cylinders for 10 to 30 seconds and at temperature of from 160° to 230° C, depending on the type of fibre. Another embodiment of the contact-heat fixing, which is particularly suitable for laboratory uses, consists in fixing the dyeing in a precision tailor's press for the corresponding times and at the temperatures mentioned above.

Naturally, the dyestuffs can be added to the dye liquors in solid form as well as in the form of concentrated stable solutions.

By the process of this invention level, strongly coloured dyeings are obtained on said fibre material, said dyeings being distinguished by their good fastness properties, especially fastness to light, dry cleaning, washing, sublimation and rubbing, without any after-treatment.

Compared with known processes for the dyeing from organic solvents, the process of this invention is especially advantageous in that it can be carried out in uniform solvents which do not constitute fire hazard, without requiring any modification of the dyestuffs otherwise usually employed in aqueous dyeing processes. The use of uniform solvents instead of mixtures of solvents consisting of polar and non-polar solvents simplifies the regeneration of the solvents. It is very surprising that the same anionic dyestuffs which can be applied in the usual dyeing processes from aqueous solution, without addition of solubilizing agents, are soluble in the non-polar aprotic solvents, usable according to the invention, to such an extent so as to yield sufficiently deep dyeings.

The following Examples illustrate the invention. Therein the temperatures are given in degrees Centigrade.

EXAMPLE 1

5 g of the dyestuff of the Formula

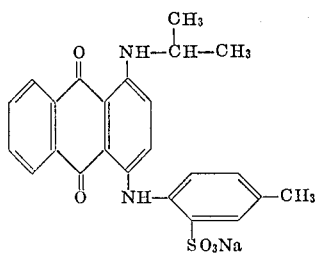

are dissolved in 1,000 ml of trichloroethylene. A fabric made from Polyamide 6.6 filament is padded at room temperature with the obtained clear blue dye solution, the impregnated fabric is squeezed out to a liquor content of about 60 percent, calculated on the dry weight of the goods, and dried for 1 minute at about 100°. The dried dyeing is then fixed for 15 seconds at 220° by means of contact heat. Without any after-treatment, a strongly coloured, even and well developed greenish blue dyeing having excellent fastness to light and wet processing is obtained.

Similar results are achieved, if in the above Example the 1,000 ml of trichloroethylene are replaced by 1,000 ml of trichloroethane or 1,000 ml of dichloromethane.

EXAMPLE 2

If, instead of a fabric made from Polyamide 6.6 filament a fabric made from Polyamide 6 is used, and the dyeing is fixed for 15 minutes at 190° by means of contact heat, the procedure being otherwise as described in Example 1, a strongly coloured greenish blue dyeing having good fastness properties is also obtained.

EXAMPLE 3

5 g of the dyestuff of the Formula

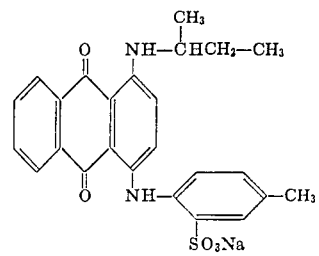

are dissolved in 1,000 ml of tetrachloroethylene. Fabric made from Polyamide 6.6 filament is padded at room temperature with the filtered blue solution, the impregnated fabric is squeezed out to a liquor content of about 70 percent, calculated on the dry weight of the goods, and dried for about 1 minute at 100°. The dried dyeing is then fixed for 15 seconds at 220° by means of contact heat.

Without any after-treatment, a strongly coloured, level and well developed greenish blue dyeing having very good fastness to light and wet processing is obtained.

If, instead of the dyestuff mentioned in this Example, 5 g of one of the dyestuffs given in the following Table I are used, the procedure being otherwise as described, greenish to reddish blue dyeings on fabric made from Polyamide 6.6 filament are obtained in an analogous manner.

TABLE I

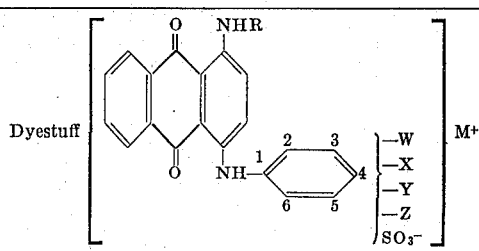

Dyestuff formula with substituents W, X, Y, Z, SO₃⁻, M⁺

| Example number | R | W | X | Y | Z | M+ | Shade on polyamide |
|---|---|---|---|---|---|---|---|
| 4 | —CH₃ | H | 4-C(CH₃)₃ | H | H | Na | Greenish blue. |
| 5 | —CH(CH₃)₂ | H | 4-CH₃ | H | H | Na | Do. |
| 6 | —CH(CH₃)₂ | H | 4-C₂H₅ | H | H | Na | Do. |
| 7 | —CH(CH₃)₂ | H | H | 4-Cl | H | Na | Blue. |
| 8 | —CH(CH₃)₂ | H | 4-(CH₂)₇—CH₃ | H | H | Na | Greenish blue. |
| 9 | —CH(CH₃)₂ | H | 4-(CH₂)₁₁—CH₃ | H | H | Na | Do. |
| 10 | —CH(CH₃)₂ | H | 4-cyclohexyl | H | H | Na | Do. |
| 11 | —CH(CH₃)₂ | H | H | 3-CF₃ | H | Na | Reddish blue. |
| 12 | —CH(CH₃)₂ | H | H | 2-OC₄H₉ | 5-OC₄H₉ | Na | Greenish blue. |
| 13 | —CH(CH₃)₂ | H | 2-CH₃ | 6-C₂H₅ | H | Na | Reddish blue. |
| 14 | —CH(CH₃)₂ | H | H | 2-OC₂H₅ | 6-OC₂H₅ | Na | Do. |
| 15 | —CH(CH₃)₂ | H | 3-CH₃ | 4-CH₃ | 5-CH₃ | Na | Do. |
| 16 | —CH(CH₃)₂ | 2-CH₃ | 3-CH₃ | 5-CH₃ | 6-CH₃ | Na | Blue. |
| 17 | —CH(CH₃)₂ | H | H | 3-C(CH₃)₃ | 5-C(CH₃)₃ | Na | Do. |
| 18 | —CH(CH₃)₂ | H | H | 4-OC₄H₉ | H | Na | Greenish blue. |
| 19 | —CH(CH₃)—CH₂—CH₃ | H | 4-CH₃ | H | H | ½ Mg | Do. |
| 20 | —CH(CH₃)—CH₂—CH₃ | H | H | 4-Br | H | Na | Blue. |
| 21 | —CH(CH₃)—CH₂—CH₃ | H | 4-CH₃ | 3-OCH₃ | H | Na | Greenish blue. |
| 22 | —CH(CH₃)—CH(CH₃)₂ | H | 4-CH₃ | H | H | Na | Do. |
| 23 | —CH(CH₃)—CH₂—CH(CH₃)₂ | H | 4-CH₃ | H | H | Na | Do. |
| 24 | —CH₂—CH(C₂H₅)—(CH₂)₃—CH₃ | H | 4-CH₃ | H | H | Na | Do. |
| 25 | —(CH₂)₇—CH₃ | H | 4-CH₃ | H | H | K | Do. |
| 26 | —(CH₂)₁₁—CH₃ | H | 4-CH₃ | H | H | NH₄ | Do. |
| 27 | cyclohexyl | H | 4-C₄H₉ | H | H | Na | Blue. |
| 28 | cyclohexyl | H | 4-CH(CH₃)₂ | H | H | Na | Do. |
| 29 | cyclohexyl-O(CH₃)₃ | H | 4-CH₃ | 3-OCH₃ | H | Na | Greenish blue. |
| 30 | trimethyl cyclohexyl | H | 4-CH₃ | H | H | Li | Blue. |

EXAMPLE 31

5 g of the dyestuff of the Formula

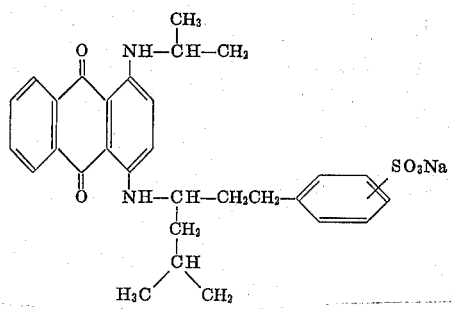

are dissolved in 1,000 ml of dichlorobenzene. A blended fabric consisting of wool and synthetic polyamide (ratio 50:50) is padded at room temperature with the blue dyestuff solution, the impregnated fabric is squeezed out to about 100 percent, calculated on the dry weight of the goods, and dried in a stream of warm air for about 1 minute at 100°.

The dried fabric is then fixed for 30 seconds at 160° with saturated steam.

A strongly coloured and well developed reddish blue dyeing having good fastness to light and wet processing is obtained.

The same result is achieved if, in this Example, the 1,000 ml of dichlorobenzene are replaced by the same volume of trichloroethane, dichloromethane, trichloroethylene or tetrachloroethylene.

If, instead of the dyestuff used in this Example, 5 g of one of the dyestuffs given in the following Table II are employed and instead of the above-described blended fabric a fabric made from synthetic polyamide is used, the procedure being otherwise as described, similar reddish blue dyeings are obtained.

TABLE II

Dyestuff:

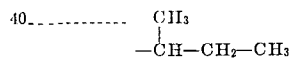

| Example number | R | $R_1$ | $R_2$ | Y | Z | $M^+$ | Shade on polyamide |
|---|---|---|---|---|---|---|---|
| 32 | —CH(CH₃)₂ | —CH₂—CH(CH₃)₂ | —CH₂—CH₂— | H | H | Li | Reddish blue. |
| 33 | —CH(CH₃)₂ | —CH₂—CH(CH₃)₂ | —CH₂—CH₂— | H | H | K | Do. |
| 34 | —CH(CH₃)₂ | —CH₃ | —CH₂—CH₂— | 2-CH₃ | 5-CH₃ | Na | Do. |
| 35 | —CH(CH₃)₂ | —CH₂—CH(CH₃)₂ | —CH₂—CH₂— | 4-CH₃ | H | Na | Do. |
| 36 | —CH(CH₃)₂ | —CH₂—CH(CH₃)₂ | —CH₂—CH₂— | 4-OCH₃ | H | Na | Do. |
| 37 | —CH(CH₃)₂ | —CH₂—CH(CH₃)₂ | —CH₂—CH₂— | 2-OCH₃ | 5-OCH₃ | Na | Do. |
| 38 | —CH(CH₃)₂ | —CH₂—CH(CH₃)₂ | —CH₂—CH₂— | 4-Cl | H | Na | Do. |
| 39 | —CH(CH₃)₂ | —CH₂—CH(CH₃)₂ | —CH₂—CH₂— | 2-Br | H | Na | Do. |
| 40 | —CH(CH₃)—CH₂—CH₃ | —CH₂—CH(CH₃)₂ | —CH₂—CH₂— | H | H | Na | Do. |
| 41 | —CH(CH₃)—CH₂—CH₃ | —CH₂—CH(CH₃)₂ | —CH₂—CH₂— | 4-CH(CH₃)₂ | H | Na | Do. |
| 42 | —CH(CH₃)—CH₂—CH₃ | —CH₂—CH(CH₃)₂ | —CH₂—CH₂— | 4-OC₄H₉ | H | Na | Do. |
| 43 | —CH(CH₃)—CH(CH₃)₂ | —CH₃ | —CH₂— | H | H | Na | Do. |
| 44 | —CH(CH₃)—CH(CH₃)₂ | —CH₃ | —CH₂— | 3-OC₄H₉ | 5-OC₄H₉ | Na | Do. |
| 45 | —CH(CH₃)—CH(CH₃)₂ | —CH₃ | —CH₂— | 2-C₄H₉ | 5-C₄H₉ | Na | Do. |
| 46 | —(CH₂)₃—CH₃ | —CH₃ | —CH₂— | H | H | Na | Do. |
| 47 | —CH(CH₃)—CH₂—CH(CH₃)₂ | —CH₃ | —CH(CH₃)—CH₂— | H | H | Na | Do. |
| 48 | —(CH₂)₇—CH₃ | —CH₂—CH(CH₃)₂ | —CH₂—CH₂— | H | H | K | Do. |
| 49 | —(CH₂)₁₁—CH₃ | —CH₂—CH(CH₃)₂ | —CH₂—CH₂— | H | H | NH₄ | Do. |
| 50 | cyclohexyl | —CH₂—CH(CH₃)₂ | —CH₂—CH₂— | H | H | ½ Mg | Do. |
| 51 | cyclohexyl | —CH₂—CH(CH₃)₂ | —CH₂—CH₂— | 4-C₄H₉ | H | K | Do. |
| 52 | 3,3,5-trimethylcyclohexyl | —CH₃ | —CH₂— | H | H | K | Do. |
| 53 | 3,3,5-trimethylcyclohexyl | —CH₃ | —CH₂— | CF₃ | H | Na | Do. |
| 54 | —(CH₂)₁₁—CH₃ | H | —CH(CH₃)—CH₂— | H | H | Na | Do. |

EXAMPLE 55

5 g of the dyestuff of the Formula

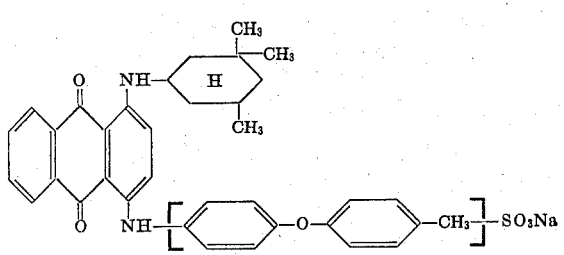

are dissolved in 1,000 ml of trichloroethylene. A fabric made from Polyamide 6.6 filament is padded at room temperature with the obtained clear blue dye solution, the impregnated fabric is squeezed out to a liquor content of about 70 percent, referred to the dry weight of the fabric, and dried for about 1 minute at 100°. The dried dyeing is then fixed for 15 seconds at 220° by means of contact heat. Without any after-treatment, a strongly coloured, even and well developed blue dyeing having good fastness to light and wet processing is obtained.

If, in the above Example, instead of the dyestuff mentioned 5 g of one of the dyestuffs given in the following Table III are used, the procedure being otherwise as described, blue dyeings on fabric made from Polyamide 6.6 filament are obtained in an analogous manner.

EXAMPLE 60

0.05 g of the dyestuff of Example 3 are dissolved in 2.5 g of water, the resulting solution being then admixed with 0.5 g of an emulsifying agent which substantially consists of the salt from dodecylbenzene sulphonic acid and iso-propoxy-propylamine, and 97 g of trichloroethylene. Then 5 g of wool flannel are introduced at 40° into the dye bath, the bath is heated in a closed system to 100° within 10 minutes and dyeing is performed for 30 minutes at this temperature. Finally, the dyeing is rinsed and dried as described in Example 59.

A level, greenish blue dyeing is obtained.

EXAMPLE 61

0.05 g of the dyestuff of Example 1 are dissolved in 100 g of trichloroethylene. At 20° 5 g of a fabric made from Polyamide 6.6 staple fibres are introduced into this solution, the bath is heated in a closed system to 100° within 15 minutes and dyeing is continued for another 20 minutes at this temperature.

The dyeing is rinsed with trichloroethylene and dried in a stream of air at 40°. A greenish blue dyeing is obtained.

What we claim is:

1. In a process for the non-aqueous dyeing of natural or synthetic polyamide fibre material with solutions of water-soluble anionic dyestuffs in non-polar aprotic organic solvents, the improvement wherein there is employed
   a. at least one water-soluble anionic dyestuff of the general Formulae I and II

TABLE III

| Example No. | R | W | X | Y | Z | M | Shade on polyamide |
|---|---|---|---|---|---|---|---|
| 56 | 2,6,6-trimethylcyclohexyl (CH₃, CH₃, H, CH₃) | H | 2-O-phenyl | 4-Cl | H | Na | Blue. |
| 57 | Same as above | H | 2-O-(methylphenyl) | H | H | Na | Do. |
| 58 | Same as above | H | 2-O-(n-C₅H₁₁-phenyl) | H | H | Na | Do. |

EXAMPLE 59

0.05 g of the dyestuff of Example 1 are dissolved in 99.5 g of tetrachloroethylene. At 40° 5 g of a fabric made from Polyamide 6.6 staple fibres are introduced into the dye bath, the bath is heated in a closed system to 120° within 10 minutes, and dyeing is performed for 30 minutes at this temperature. After rinsing in tetrachloroethylene and drying in a stream of air at 40°, a strongly coloured, greenish blue dyeing is obtained.

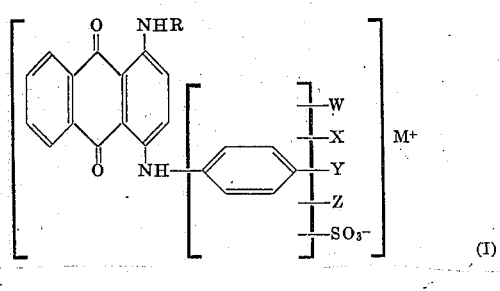

(I)

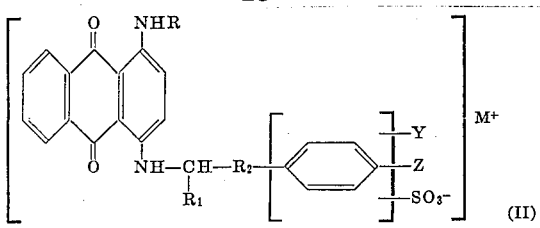

wherein
R represents an alkyl group having from 1 to 12 carbon atoms or a cyclohexyl radical unsubstituted or substituted by lower alkyl groups,
$R_1$ represents hydrogen or a lower alkyl group,
$R_2$ represents a lower alkylene radical,
W represents hydrogen or a methyl group,
X represents hydrogen, an alkyl group having from 1 to 12 carbon atoms, the cyclohexyl radical or a phenoxy radical unsubstituted or substituted by halogen atoms, alkyl or alkoxy groups having from 1 to 5 carbon atoms,
Y represents hydrogen, a lower alkyl group, the trifluoromethyl group, a lower alkoxy group or a halogen atom,
Z represents hydrogen, a lower alkyl group or a lower alkoxy group, and
$M^+$ represents an alkali metal cation, ammonium or half the equivalent of the charge of an alkaline earth metal cation, dissolved in
b. an unsubstituted or halogenated aromatic, aliphatic or cycloaliphatic liquid hydrocarbon having a boiling point above 30°C, or mixtures of such non-polar aprotic organic solvent.

2. A process as defined in claim 1 wherein the dyestuff is a water-soluble anionic dyestuff of Formula I, wherein R represents a lower alkyl group or a cyclohexyl radical unsubstituted or substituted by methyl, W and Z each represent hydrogen, X represents hydrogen or a methylphenoxy radical, Y represents a lower alkyl group or a halogen atom, and $M^+$ represents an alkali metal cation.

3. A process as defined in claim 1 wherein the dyestuff is a water-soluble anionic dyestuff of Formula I wherein R and Y each represent a lower alkyl group, W, X and Z each represent hydrogen and $M^+$ represents the sodium cation.

4. A process as defined in claim 1 wherein the dyestuff is a water-soluble anionic dyestuff of Formula II wherein R and $R_1$ each represent a lower alkyl group, $R_2$ represents the dimethylene radical, Y and Z each represent hydrogen and $M^+$ represents an alkali metal cation.

5. A process as defined in claim 1, wherein said hydrocarbon solvent defined under (b) is selected from xylene, monochlorobenzene, dichlorobenzene, trichlorobenzene, tetrahydronaphthalene, hexane, heptane, octane, decane, perfluorohexane, perfluoroheptane, cyclohexane, cyclohexene, dichloromethane, chloroform, carbon tetrachloride, trichloroethylene, tribromoethylene, tetrachloroethylene, trichloroethane, tetrachloroethane, 1,1,2-trichloro-2,2,1-trifluoroethane, 1,1,1,2-tetrachloro-2,2-difluoroethane, pentachlorofluoroethane, 1-chloro-3-fluoropropane, and mixtures thereof.

6. A process as defined in claim 1, wherein said hydrocarbon solvent defined under (b) is a lower aliphatic chlorinated hydrocarbon.

7. A process as defined in claim 6, wherein said lower aliphatic chlorinated hydrocarbon is tetrachloroethylene.

8. A process as defined in claim 1 wherein the fiber material is synthetic polyamide fibre material.

* * * * *